(12) United States Patent
Takahashi

(10) Patent No.: US 7,303,204 B2
(45) Date of Patent: Dec. 4, 2007

(54) WHEELED VEHICLE WITH STAND

(75) Inventor: Haruhito Takahashi, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 428 days.

(21) Appl. No.: 11/127,826

(22) Filed: May 12, 2005

(65) Prior Publication Data

US 2005/0275191 A1    Dec. 15, 2005

(30) Foreign Application Priority Data

Jun. 15, 2004    (JP)    ............................ 2004-177587

(51) Int. Cl.
*A41B 1/00*    (2006.01)
(52) U.S. Cl. ...................... 280/302; 280/301
(58) Field of Classification Search ................ 280/293, 280/301, 763.1, 302; 211/17, 20; 248/188.8, 248/351
See application file for complete search history.

(56) References Cited

U.S. PATENT DOCUMENTS

| | | | | |
|---|---|---|---|---|
| 4,073,505 A | * | 2/1978 | Yamazaki | ................... 280/301 |
| 4,445,705 A | * | 5/1984 | Hayashi et al. | ............. 280/302 |
| 5,388,848 A | * | 2/1995 | Silva et al. | .................. 280/300 |
| 6,918,607 B2 | * | 7/2005 | Nakazawa et al. | .......... 280/301 |

FOREIGN PATENT DOCUMENTS

JP    2003-72611    3/2003

* cited by examiner

*Primary Examiner*—Tony Winner
(74) *Attorney, Agent, or Firm*—Keating & Bennett, LLP

(57) ABSTRACT

A wheeled vehicle includes a frame. A power unit powers the vehicle. The frame supports the power unit. A stand body includes a pair of legs that are transversely spaced apart from each other. The stand body moves between an extended position and a retracted position. The stand body supports the frame on the ground in the extended position. A pivot pin extends substantially transversely through a bottom portion of the power unit and a top portion of the stand body to pivotally couple the power unit and the stand body with each other. A bias member biases the stand body toward the extended position and toward the retracted position. The bias member extends between a side portion of the power unit and a lower portion of one of the legs of the stand body. A top of the stand body and a bottom of the power unit contact each other at first portions thereof. The top of the stand body and the bottom of the power unit are spaced apart from each other at second portions thereof. The second portions are arranged closer to the bias member than the first portions.

20 Claims, 11 Drawing Sheets

AT NORMAL EXTENDED POSITION EP

AT ABNORMAL EXTENDED POSITION E2 under 35 U.S.C. § 119 to Japanese Patent Application No. 2004-177587, filed on Jun. 15, 2004, the entire contents of which are expressly incorporated by reference herein.

WHEELED VEHICLE WITH STAND

PRIORITY INFORMATION

The present application is based on and claims priority under 35 U.S.C. § 119 to Japanese Patent Application No. 2004-177587, filed on Jun. 15, 2004, the entire contents of which are expressly incorporated by reference herein.

BACKGROUND OF THE INVENTION

1. Field of the Invention

The present invention relates to a wheeled vehicle having a stand, and more particularly to a wheeled vehicle having a stand to support the vehicle in an upright position.

2. Description of Related Art

Wheeled vehicles such as, for example, scooters and mopeds typically have a frame that supports front and rear wheels, an engine, a seat and other components. The engine is connected to a transmission to define an engine unit. The seat is located above the engine unit such that a rider can straddle the seat to drive the vehicle.

Typically, such a wheeled vehicle includes a stand to support the vehicle in an upright position. Conventionally, two types of stands are available. One type is designed to support the vehicle by lifting a rear wheel above the ground. This type of stand is usually called a main stand because the stand can support the vehicle for a long duration. Another type of stand is designed to support the vehicle together with the front and rear wheels being in contact with the ground. This type of stand is called as a sub stand or a kick stand because the stand can support the vehicle for shorter durations.

In one arrangement, the wheeled vehicle includes a main stand pivotally affixed to a bottom portion of the engine unit, and the engine unit is swingably suspended together with the main stand. For example, Japanese Patent Publication P2003-72611A discloses such an arrangement. The main stand in this arrangement, however, loses stability in supporting the vehicle due to long-term use.

With reference to FIGS. 1-3, a conventional main stand 20 includes a stand body 22. The stand body 22 includes a pair of legs. An engine unit 24 includes a bottom portion 26. A pivot pin extends through apertures 27 defined by the stand body 22 and the bottom portion 26 to pivotally couple the stand body 22 and the engine unit 24 with each other. A bias spring 28 extends between one of the legs and a side surface of the engine unit 24. The stand body 22 moves between an extended position and a retracted position. The stand body 22 extends to the ground to support the vehicle at the extended position as shown in FIGS. 2 and 3, while the stand body 22 is retracted toward the engine unit 24 at the retracted position such that the stand body 22 does not extend to the ground. Usually, a top of the stand body 22 abuts the bottom portion of the engine unit 24 along a line. In both of the extended position and the retracted position, the bias spring 28 provides a compression force toward the stand body 22. Hence, the main stand 20 is firmly maintained at the extended position or the retracted position.

Because of being attached to the engine unit 24, the vibration of the engine unit 24 is transmitted to the main stand 20. The pivot pin thus can frequently move within the apertures 27. As a result, the aperture 27 can be worn and become larger after extended use. In addition, the swing movement of the engine unit 24 may accelerate the wear of the apertures 27. Under these conditions, the top end of the stand body 22 no longer abuts the bottom of the engine unit 24 along the line and rather touches the bottom portion 26 of the engine unit 24 at a point P1 because of the pull of the bias spring 28. The stand body 22 thus slightly inclines as indicated by the arrow B1 of FIG. 2 and stops at an extended position E1 of FIG. 3. The position E1 is different from a normal extended position EP that is indicated by the phantom line of FIG. 3.

The point P1 is located closer to the spring 28 than the line along which the tops of the legs 22 abut the bottom portion 26 of the engine unit 24. Thus, a distance L1 between the point P1 and the spring 28 is shorter than a former distance. The shorter distance L1 causes a smaller bias force to be applied by the spring 28 that can affect the stand body 22. The main stand 20 thus can easily move between the abnormal extended position E1 and the normal extended position EP. As a result, the main stand 20 loses stability in supporting the vehicle. In other words, the main stand 20 tends to move back to the retracted position when a light force is applied to the body of the vehicle.

SUMMARY OF THE INVENTION

To overcome the problems described above, preferred embodiments of the present invention provide a wheeled vehicle including a stand that securely supports the vehicle in an upright position even after extended use.

A preferred embodiment of the present invention provides a wheeled vehicle including a frame. A power unit is provided to power the vehicle. The frame supports the power unit. A stand body includes a pair of legs that are transversely spaced apart from each other. The stand body moves between an extended position and a retracted position. The stand body supports the frame on the ground at the extended position. A pivot pin extends substantially transversely through a bottom portion of the power unit and a top portion of the stand body to pivotally couple the power unit and the stand body with each other. A bias member is arranged to bias the stand body toward the extended position and toward the retracted position. The bias member extends between a side portion of the power unit and a lower portion of one of the legs of the stand body. A top portion of the stand body and a bottom portion of the power unit contact each other at first portions thereof. The top portion of the stand body and the bottom portion of the power unit are spaced apart from each other at second portions thereof. The second portions are located closer to the bias member than the first portions.

In accordance with another preferred embodiment of the present invention, a wheeled vehicle includes a frame. A power unit is provided to power the vehicle. The frame supports the power unit. A stand body includes a pair of legs that are transversely spaced apart from each other. The stand body moves between an extended position and a retracted position. The stand body supports the frame on the ground at the extended position. A pivot pin extends substantially transversely through a bottom portion of the power unit and a top portion of the stand body to pivotally couple the power unit and the stand body with each other. A bias member is arranged to bias the stand body toward the extended position and toward the retracted position. The bias member extends between a side portion of the power unit and a lower portion of one of the legs of the stand body. The top portion of the stand body includes a first peripheral edge on a side of the stand body that is closer to the bias member than another side of the stand body. The bottom portion of the power unit includes a second peripheral edge on a side of the power unit that is closer to the bias member than another side of the power unit. The top portion of the stand body or the bottom portion of the power unit includes a third peripheral edge arranged to maintain the first and second peripheral edges spaced apart from each other.

In accordance with a further preferred embodiment of the present invention, a wheeled vehicle includes a frame. A power unit is provided to power the vehicle. The frame supports the power unit. A stand body includes a pair of legs that are transversely spaced apart from each other. The stand body moves between an extended position and a retracted position. The stand body supports the frame on the ground at the extended position. A pivot pin extends substantially transversely through a bottom portion of the power unit and a top portion of the stand body to pivotally couple the power unit and the stand body with each other. A bias member is arranged to bias the stand body toward the extended position and toward the retracted position. The bias member extends between a side portion of the power unit and a lower portion of one of the legs of the stand body. The top portion of the stand body includes a first peripheral edge on a side of the stand body that is closer to the bias member than another side of the stand body. The bottom portion of the power unit includes a second peripheral edge on a side of the power unit that is closer to the bias member than another side of the power unit. At least one element is provided to prevent the first and second peripheral edges from contacting each other.

In accordance with a still further preferred embodiment of the present invention, a method is provided for attaching a stand to a power unit of a wheeled vehicle. The method includes the steps of setting at least two molds so as to be offset from one another, casting a housing of the power unit, the housing having a step created by the two molds, pivotally attaching the stand to the housing such that the stand faces the step, and attaching a bias member to extend between one side of the housing and one side of the stand that is the same side as the one side of the housing, creating a space between the housing and the stand, wherein the space opens toward the side at which the bias member is attached.

These and other features, elements, steps, characteristics and advantages of the present invention will become more apparent from the following detailed description of preferred embodiments of the present invention with reference to the attached drawings.

DETAILED DESCRIPTION OF PREFERRED EMBODIMENTS

Figure 1:
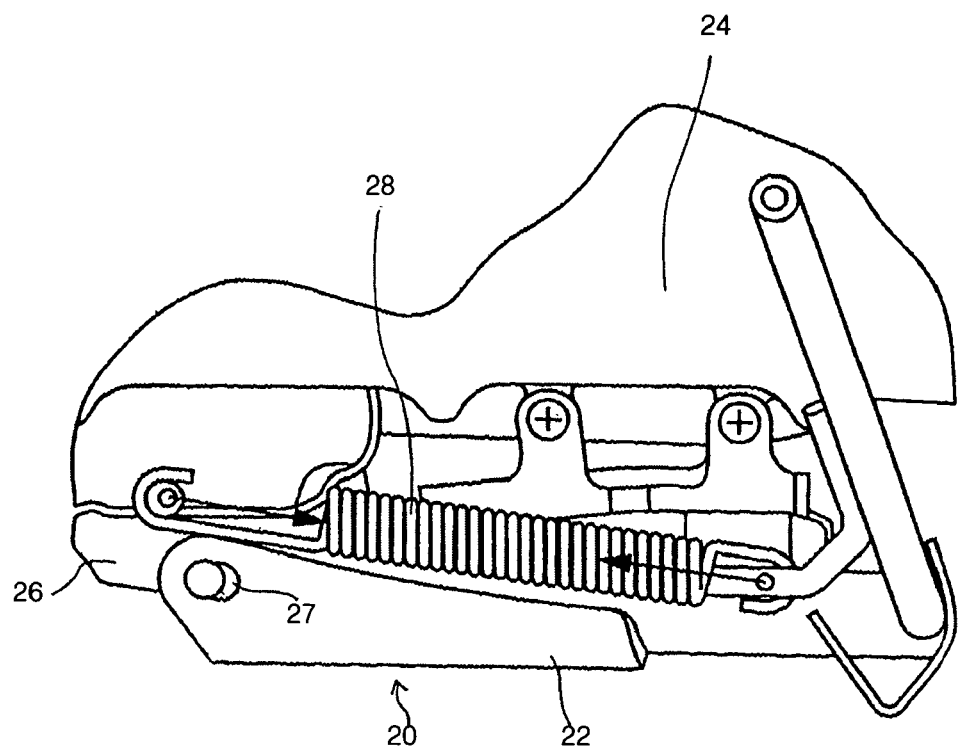
FIGS. 1-3 illustrate a conventional main stand to explain a problem that is caused by extended use of a vehicle, and these figures thus do not illustrate preferred embodiments of the present invention.
Figure 2:
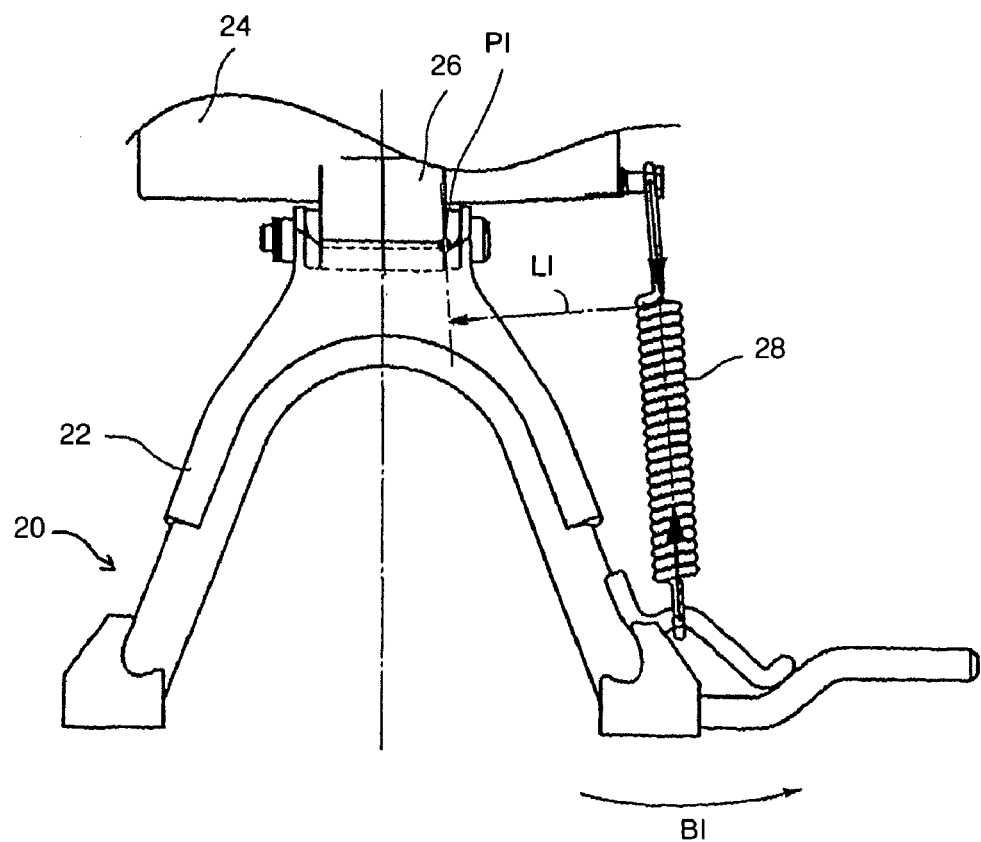
Figure 3:
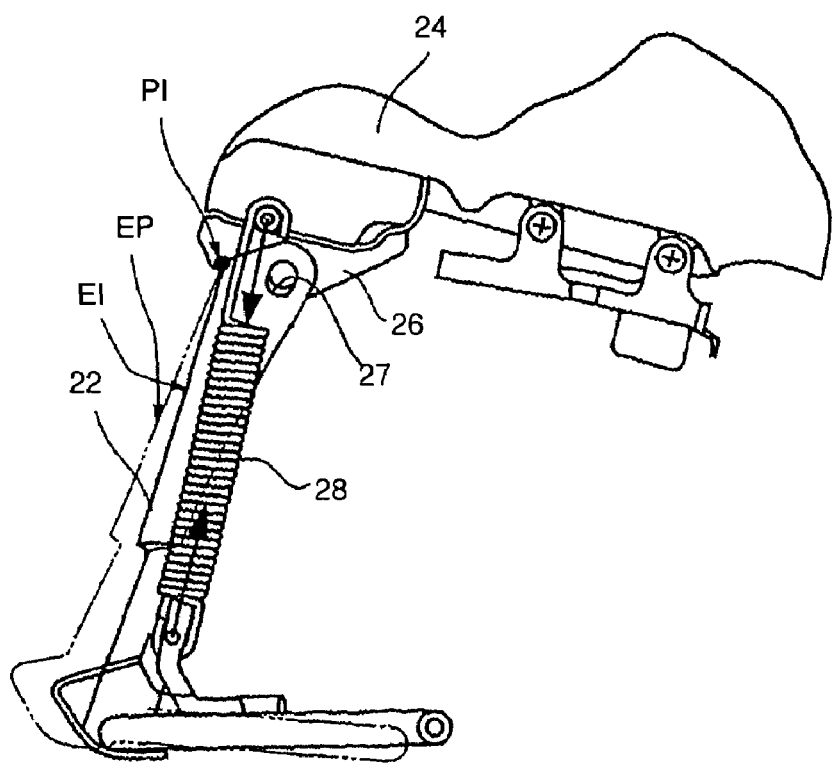
Figure 4:
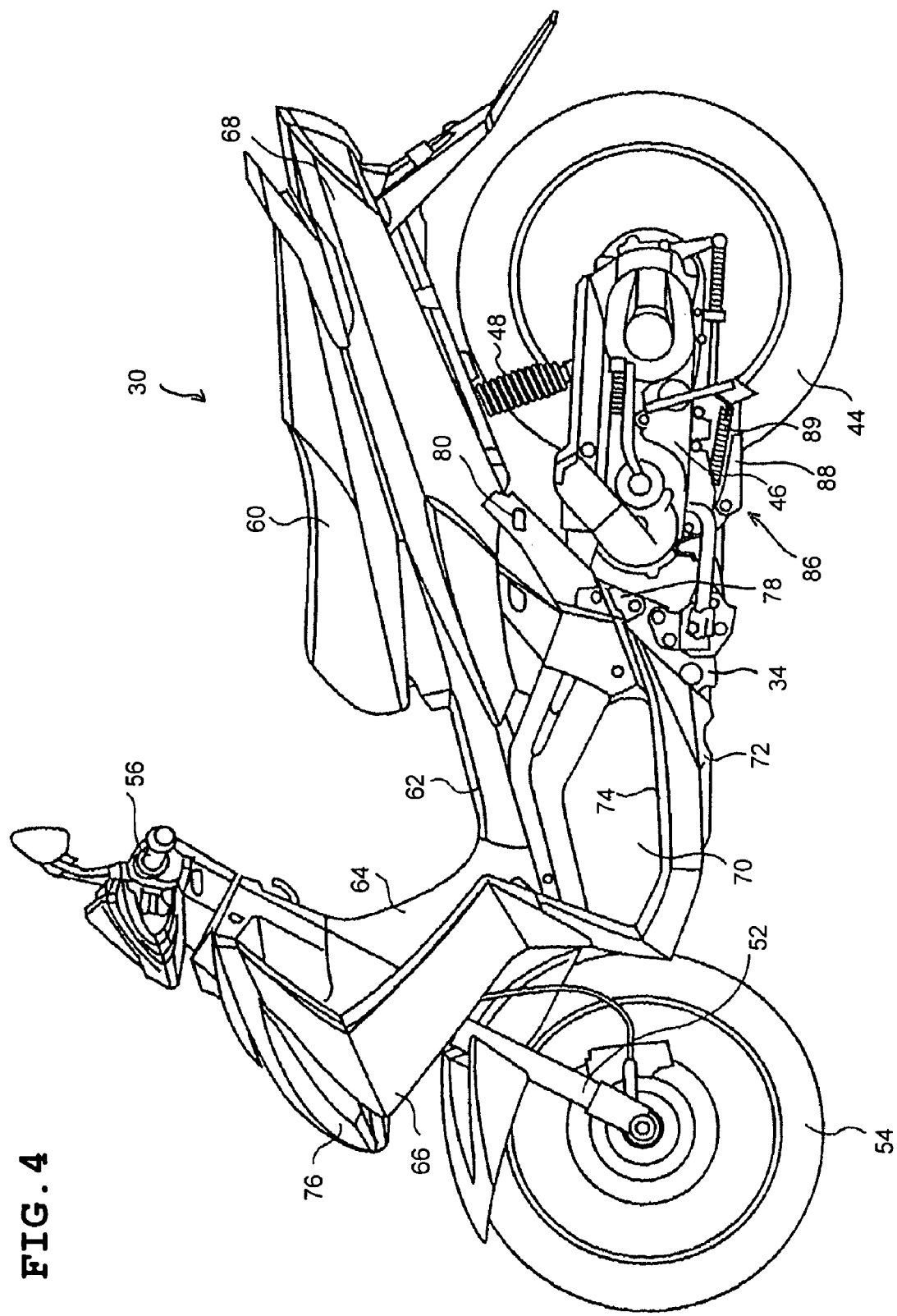
FIG. 4 illustrates a side elevation view of a moped configured in accordance with a preferred embodiment of the present invention.
Figure 5:
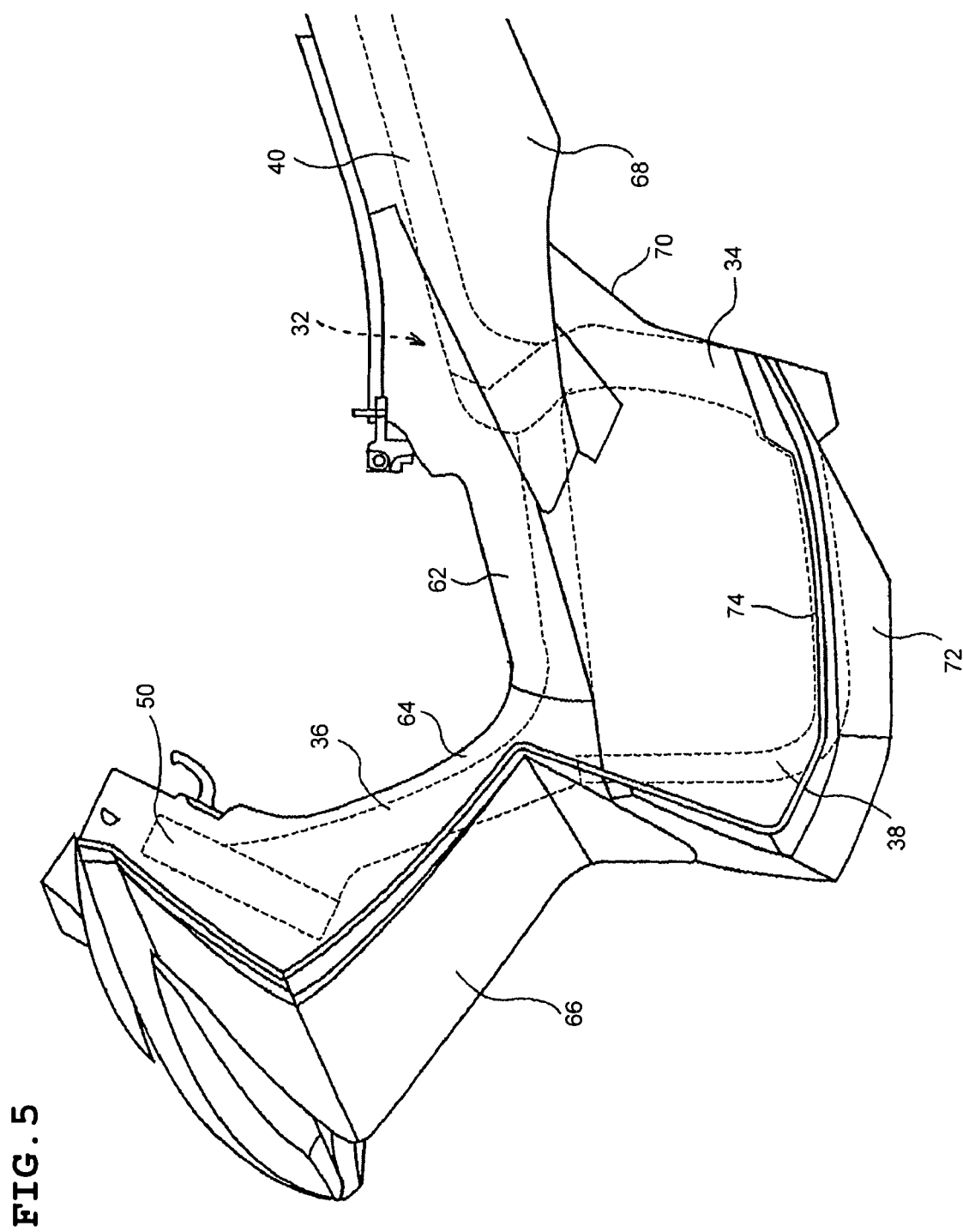
FIG. 5 illustrates a side elevation view of a major portion of the moped of FIG. 4, in which a frame of the moped is shown in phantom.

With reference to FIGS. 4 and 5, an overall construction of a moped 30 configured in accordance with a preferred embodiment of the present invention is described. The moped, 30 merely exemplifies one type of wheeled vehicle. A main stand structure described below can be applied for other types of wheeled vehicles such as, for example, motor cycles and scooters. Such applications will be apparent to those of ordinary skill in the art in light of the description herein.

As used throughout this description, the terms "forward" and "front" mean at or to the side where the leading end of the moped 30 is disposed, and the terms "rear" and "rearward" mean at or to the opposite side of the front side, unless indicated otherwise or otherwise readily apparent from the context used. Also, as used in this description, the term "horizontally" means that the subject portions, members or components extend substantially parallel to the ground when the moped 30 is upright. The term "vertically" in turn means that portions, members or components extend substantially perpendicular to those that extend horizontally.

The moped 30 includes a frame 32 (FIG. 5) that defines a base of the moped 30. The frame 32 preferably includes a pair of bracket sections 34, a main frame section 36, a sub frame section or down-tube 38, a pair of seat rails 40 and several cross bars or cross members.

Both of the bracket sections 34 extend substantially vertically and are connected with each other through the cross bars. The bracket sections 34 support a power unit and a rear wheel 44. In the illustrated preferred embodiment, a combination of an internal combustion engine and a transmission, i.e., an engine unit 46 forms the power unit. An electric motor, for example, may replace the engine. The rear wheel 44 is preferably a propulsive wheel in the illustrated preferred embodiment, and the engine unit 46 powers the rear wheel 44. A center of the illustrated engine unit 46 is disposed substantially on a longitudinal center plane LCP (FIG. 8) of the moped 30 that extends vertically and from front to rear when the moped 30 is upright. A rear portion of the engine unit 46, however, is off-set to the left hand side relative to the longitudinal center plane LCP such that the rear wheel 44 and a muffler of an exhaust system for the engine can be provided in the remaining space.

The engine unit 46 preferably swings up and down or pivots about a swing axis that extends transversely at respective bottom ends of the bracket sections 34. The rear portion of the engine unit 46 preferably accommodates the axle of the rear wheel 44, and is defined by an output shaft of the engine unit 46. Preferably, a suspension 48 extends between the engine unit 46 and the seat rail 40 on the left hand side of the moped 30 to absorb shock.

The main frame section 36 preferably includes a horizontal portion and a vertical portion. The horizontal portion extends forward from a top end of the bracket section 34 on the right hand side. The vertical portion extends upward from a forward end of the horizontal section. A head pipe 50 is welded to a top portion of the vertical portion. The head pipe 50 accommodates a steering shaft that includes a pair of front forks 52 at a bottom portion thereof. The axle of a front wheel 54 is interposed between the front forks 52. A handle bar 56 extends substantially horizontally from a top portion of the steering shaft. The handle bar 56 includes handle grips at respective ends thereof. The rider steers the moped 30 by turning the handle bar 56. The handle bar 56 preferably includes a throttling device that controls the power of the engine, and brake levers that stops the rotation of the front wheel 54 and the rear wheel 44 through braking devices.

The illustrated sub frame section 38 also includes horizontal and vertical portions. The horizontal portion preferably extends forward below the horizontal portion of the main frame section 36. The vertical portion further extends upward toward a bottom of the vertical portion of the main frame section 36 from a forward end of the horizontal section. The vertical portion of the sub frame section 38 is coupled with the vertical portion of the main frame section 36.

The seat rails 40 are preferably connected with each other through the cross bars or cross members. The seat rails 40 support a tandem seat 60. Preferably, the seat 60 is detachably fixed to the frame 32. Two riders can straddle and sit on the seat 60.

The respective bracket sections 34 are transversely spaced apart from each other and the seat rails 40 are transversely spaced apart from each other so as to extend substantially symmetrically on both sides of the longitudinal plane LCP. That is, the moped 30 in the illustrated preferred embodiment is substantially symmetrical relative to the longitudinal center plane LCP. The components of the frame 32 are preferably welded together or joined by proper fasteners such as, for example, bolts and nuts.

With reference to FIGS. 4 and 5, multiple covers are provided to cover the frame 32. The covers in the illustrated preferred embodiment include a center cover 62, a leg shield 64, a front cover 66, a pair of side covers 68, a pair of lower covers 70 and a bottom cover 72. A pair of foot boards 74 is provided to support the feet of the rider (driver) straddling the seat 60.

The center cover 62 covers a top surface of the horizontal portion of the main frame section 36 and front portions of the respective seat rails 40. The leg shield 64 covers a rear surface of the vertical portion of the main frame section 36. The front cover 66 covers a front surface of the vertical portion of the main frame section 36. The side covers 68 cover respective side surfaces of the seat rails 40. The lower covers 70 extend substantially vertically below the center cover 62 on both sides of the moped 30 to cover respective side surfaces of the bracket sections 34, the sub frame section 38, a forward portion of the engine unit 46 and components for the engine unit 46 such as, for example, an air cleaner. The bottom cover 72 extends substantially horizontally below the foot boards 74 to cover respective bottom surfaces of the bracket sections 34, the sub frame section 38, the forward portion of the engine unit 46 and other components of the moped 30. The center cover 62, the leg shield 64, the front cover 66, the side covers 68, the lower covers 70 and the bottom cover 72 cover substantially the entire frame 32 of the moped 30.

The front cover 66 preferably includes a pair of recesses in a forward portion on both sides of the longitudinal center plane LCP. Head lamp assemblies 76 are inserted into the respective recesses to be located at the forward-most end of the front cover 66.

A pair of stays 78 extends from the bracket sections 34 of the frame 32. Each stay 78 includes a foot rest 80 for another rider who straddles the seat 60 behind the driver. The respective foot rests 80 move between an extended position and a retracted position.

With reference to FIGS. 4 and 6-12, the moped 30 includes a main stand 86 to support the moped 30 in an upright position. The main stand 86 is pivotally affixed to the engine unit 46 in accordance with a preferred embodiment of the present invention. As used throughout this description, the term "main stand" means a stand that is designed to support a vehicle (i.e., the moped 30 in the illustrated preferred embodiment) in an upright position by supporting a rear wheel above the ground. Any stands that can function as defined are not be excluded even if those stands have other names.

The main stand 86 preferably includes a stand body 88 and a bias spring 89. The stand body 88 preferably includes a pair of legs 90 transversely spaced apart from each other. Preferably, the legs 90 are configured to have a substantially inverted V or U shape. In other words, the respective bottom portions of the legs 90 are spaced farther apart than the respective top portions of the legs 90. Each leg 90 includes a base 91 at the bottom portion thereof. The stand body 88 preferably includes a pair of projections 92 at a top portion thereof where the legs 90 merge each other. That is, the top portion of the stand body 88 is configured to have a substantially U-shaped configuration. The projections 92 are spaced apart from each other and opposed to one another. Each projection 92 includes an aperture 94. Each aperture 94 preferably has a substantially round shape.

The engine unit 46 includes an outer housing 95 preferably made of metal. The housing 95 preferably includes a bottom portion 96 that protrudes downward. The illustrated bottom portion 96 is narrower than the remainder of the housing 95. Preferably, the outer housing 95 is produced in a casting process and at least two molds are used in the casting process.

A center of the bottom portion 96 is preferably is arranged on the longitudinal center plane LCP. The bottom portion 96 preferably includes an aperture that extends transversely through the bottom portion 96. That is, an axis of the aperture extends substantially perpendicular to the LCP. The aperture of the bottom portion 96 has a substantially round shape and an inner diameter that is approximately equal to an inner diameter of the aperture 94 of the stand body 88. Because of the feature of the aperture of the bottom portion 96, the reference numeral 94 represents the aperture of the bottom portion 96 also unless otherwise described.

The bottom portion 96 of the engine unit housing 95 is interposed between the projections 92 of the stand body 88. Preferably, the stand body 88 disposed in this manner is substantially symmetrical. That is, both of the legs 90 extend symmetrically relative to the longitudinal center plane LCP. A pivot pin 100 extends through the apertures 94 to pivotally couple the stand body 88 and the engine unit 46 with each other. Preferably, a fastener is provided to prevent the pivot pin 100 from slipping out of the apertures 94. A pivotal axis 101 of the pivot pin 100 is substantially aligned with the axis of the apertures 94. The stand body 88 pivots about the axis of the pivot pin 100. Normally, an outer diameter of the pivot pin 100 is approximately equal to the inner diameter of the apertures 94.

The leg 90 on the left hand side of the longitudinal center plane LCP (i.e., the right side of FIG. 6) preferably includes a hook 102. A side surface of the bottom portion 96 on the left side of the longitudinal center plane LCP (i.e., the right side of FIG. 6) preferably includes a projection 104 extending outward. The projection has a center axis 103 that is not aligned with the pivotal axis 101 of the pivot pin 100. The bias spring 89 extends between the hook 102 and the projection 104. The illustrated bias spring 89 is a compressive coil spring. The arrows 105 of FIGS. 7 and 8 indicate the compression force of the spring 89.

Figure 10:
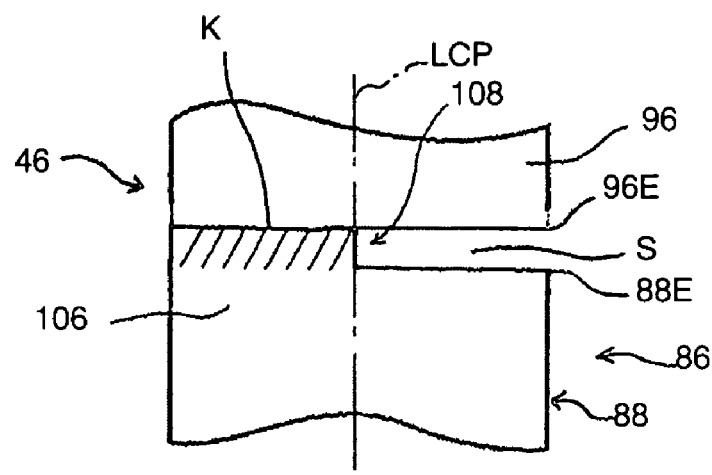
FIG. 10 schematically illustrates the main stand abutting against an engine unit of the moped in a normal extended position.

In the illustrated preferred embodiment, as best shown in FIG. 10, a forward end 106 of the top portion of the stand body 88 includes a step 108. In other words, half of the forward end 106 on the right hand side of the longitudinal center plane LCP (i.e., the left hand side of FIG. 10) is higher than the other half of the forward end 106 on the left hand side. The right half of the forward end 106 (i.e., the left half of FIG. 10) contacts or abuts on the bottom portion 96 with a line K. The term "line" should not be strictly limited to the mathematical meaning. That is, the line K may have a specific area or width.

The right half of the forward end 106 and the half of the bottom portion 96 that contact each other define first portions. That is, the first portions together define the line K. The left half of the forward end 106 and the other half of the bottom portion 96 that do not contact each other define second portions. That is, the second portions together define a space S. A peripheral edge 88E of the stand body 88 and a peripheral edge 96E of the bottom portion 96 of the engine unit housing 95 are spaced apart from each other by the space S. The first portions and the second portions are separated by the step 108. The second portions are arranged closer to the bias spring 89. In addition, the space S is preferably large enough such that the peripheral edge 88E of the stand body 88 and a peripheral edge 96E of the bottom portion 96 of the engine unit housing 95 are still spaced apart when the peripheral edges 88E, 96E approach each other.

The stand body 88 may be positioned in an extended position and a retracted position. In other words, the stand body 88 moves between the extended position and the retracted position.

Figure 6:
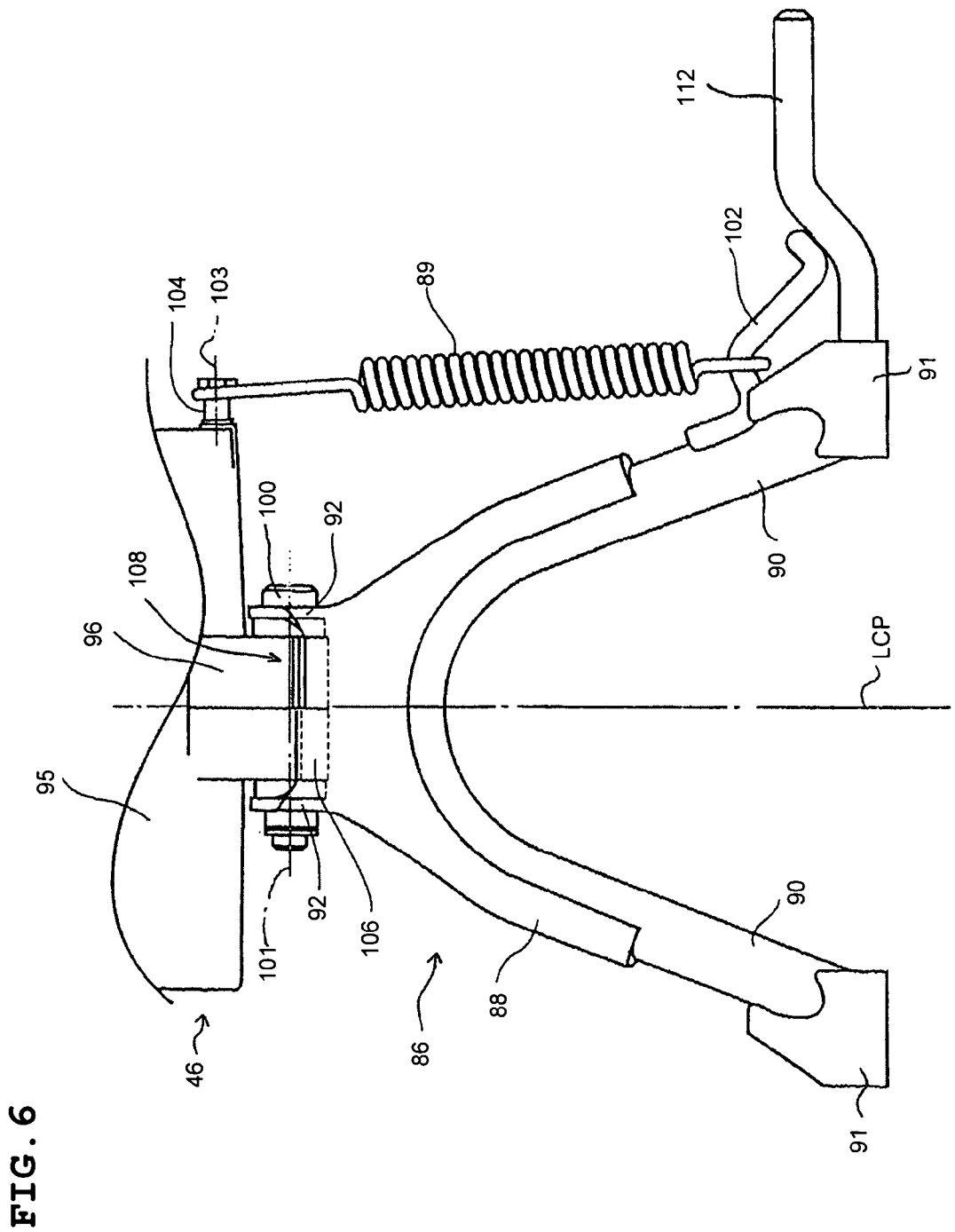
FIG. 6 illustrates a partial front elevation view of the moped of FIG. 4 showing a main stand configured in accordance with a preferred embodiment of the present invention, with the main stand in an extended position.
Figure 8:
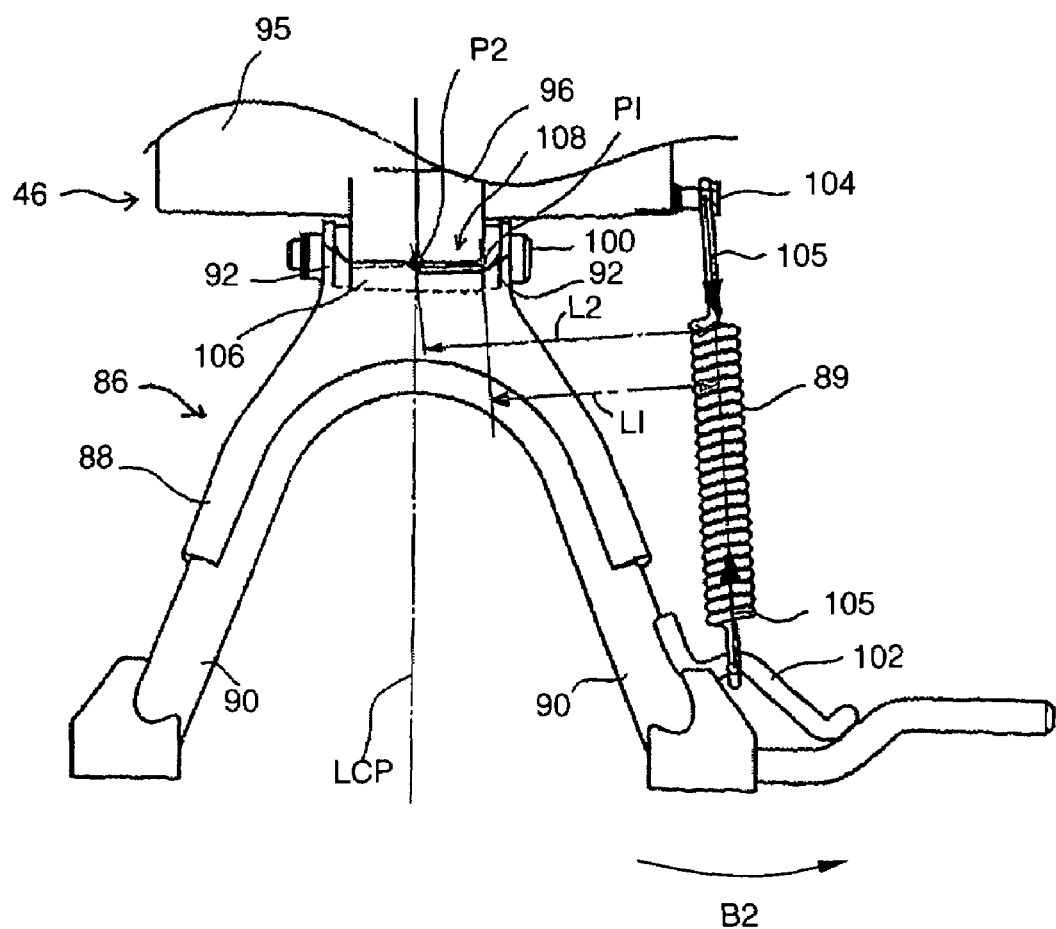
FIG. 8 illustrates a partial front elevation view of the moped to explain the features, aspects and advantages of the main stand according to a preferred embodiment of the present invention in greater detail.
Figure 9:
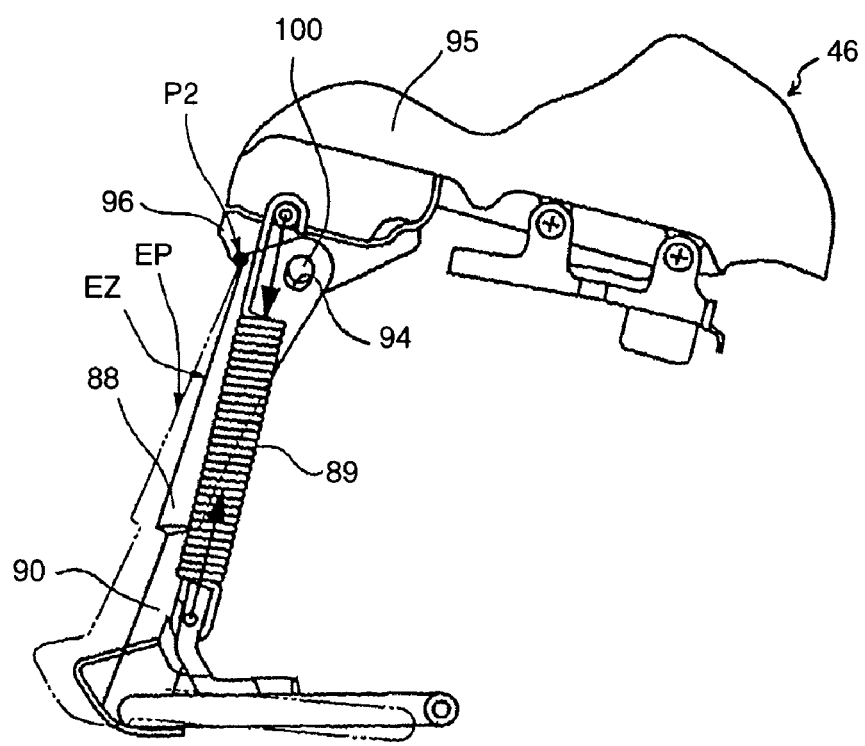
FIG. 9 illustrates a partial side elevation view of the moped to explain the features, aspects and advantages of the main stand according to a preferred embodiment of the present invention in greater detail.

At the extended position, as shown in FIGS. 6, 8 and 9, the legs 88 extend to the ground and the bases 91 contact the ground. The forward end 106 of the top portion of the stand body 88 abuts against the bottom portion 96 of the engine unit housing 95 and acts as a stopper to retain the stand body 88 at the extended position. Also, the bias spring 89 applies a compression force to the stand body 88 such that the stand body 88 is maintained in the extended position. This is because the bias spring 89 is positioned between the pivot pin 100 and the forward end 106 (i.e., stopper) as best shown in FIG. 9. Thus, the main stand 86 securely supports the moped 30 in the upright position. Because the entire body of the moped 30 is raised by the stand body 88, the rear wheel 44 is disposed above the ground.

Figure 7:
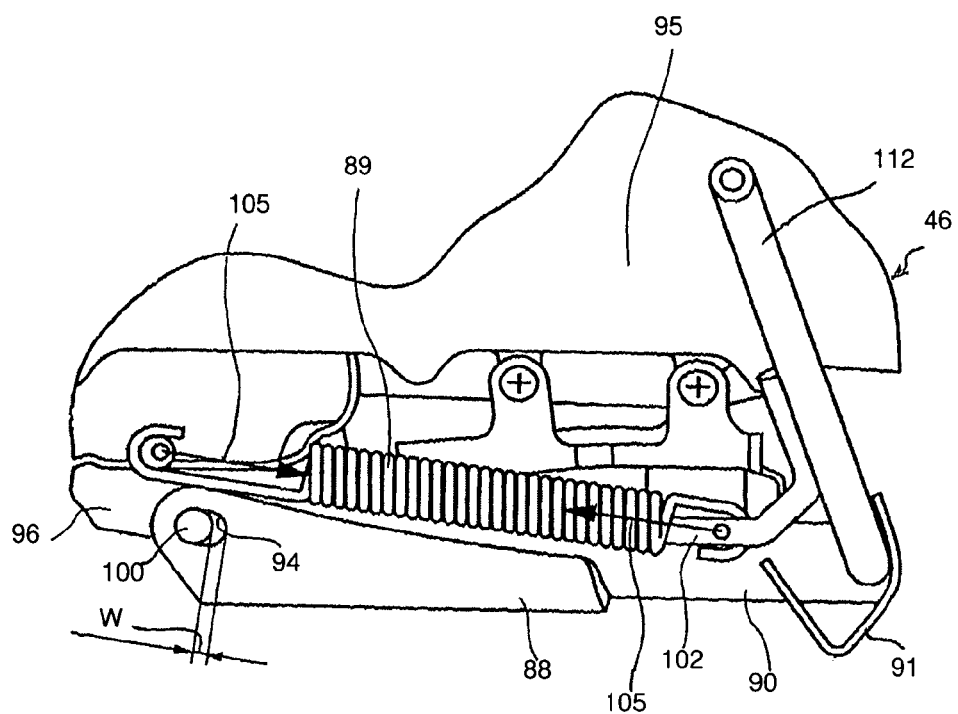
FIG. 7 illustrates a partial side elevation view of the moped of FIG. 4 showing the main stand of FIG. 6, with the main stand located in a retracted position.

At the retracted position, as shown in FIG. 7, the legs 90 are retracted toward the bottom portion 96 of the engine unit housing 95. That is, the stand body 88 extends substantially horizontally in the retracted position. Under this condition, the bias spring 89 also provides a compression force to the stand body 88 such that the stand body 88 stays in the retracted position. This is because the bias spring 89 is located above the stand body 88. Because the rear wheel 44 contacts the ground when the stand body is in the retracted position, the rider can drive the moped 30.

A kick projection 112 preferably extends outward from the bottom of the leg 90 and adjacent to the hook 102. The rider can kick the projection 112 to move the stand body 88 to the extended position from the retracted position and vice versa. The bias spring 89 briefly extends so as to be longer against the compression force when the stand body 88 moves between the extracted position and the retracted position.

With continued reference to FIG. 6-12, the apertures 94 may become larger due to extended use of the moped 30. Usually, the apertures 94 become slots. That is, the apertures 94 are worn by the pivot pin 100. A wear amount W is shown in FIG. 7. Under this condition, the top portion of the stand body 88 no longer abuts against the bottom portion 96 of the engine unit housing 95 along the foregoing line K and rather contacts the bottom portion 96 at a point P2 due to the force of the bias spring 28. Similar to the line K, the point P2 may have a specific area. Thus, the stand body 88 slightly moves as indicated by the arrow B2 of FIG. 8 and stops at an extended position E2 of FIG. 9. The position E2 is an abnormal extended position and is different from the normal extended position EP that is indicated by the phantom line of FIG. 9.

Figure 11:
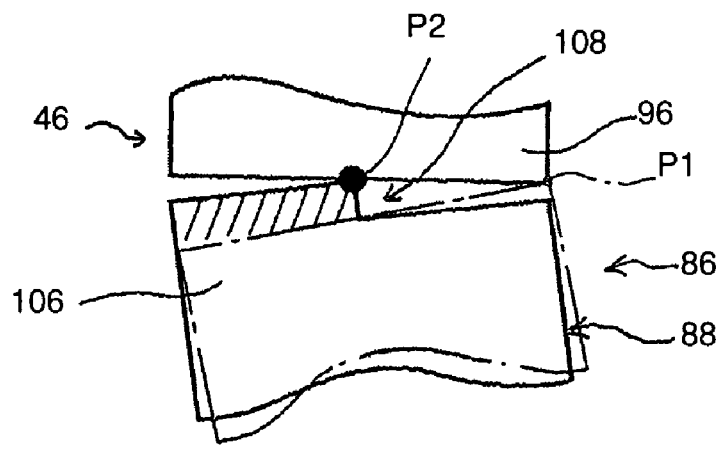
FIG. 11 schematically illustrates the main stand abutting against the engine unit at an abnormal extended position, with the main stand located at the abnormal extended position without any improvement is shown in phantom.

As best shown in FIG. 11, the point P2 is defined at a peripheral edge of the step 108 of the stand body 88. The point P2 is farther from the bias spring 89 than the point P1 where the forward end 106 of the stand body 88 touches the bottom portion 96 of the engine unit 46 if the step 108 is not provided. That is, as shown in FIG. 8, a distance L2 between the point P2 and the spring 89 is longer than the distance L1 between the point P1 and the spring 89., Thus, the compression force of the spring 89 that is applied to the stand body 88 is maintained to a greater extent. In other words, the stabilizing moment or holding moment of the stand body 88 is sufficiently maintained. Thus, the main stand 86 securely maintains the body of the moped 30 in an upright position even after extended use. Because no additional components or members are required, the main stand structure is inexpensive.

The point P2 is not necessarily provided directly on the longitudinal center plane LCP and may be shifted toward the bias spring 89 or may be shifted to be spaced apart farther from the spring 89. If the point P2 is shifted toward the spring 89, the length of the line K increases. On the other hand, if the point P2 is shifted so as to be spaced farther apart from the spring 89, the length of the line K decreases. A certain length of the line K is required to maintain the stand body 88 at the normal extended position before the apertures 94 becomes larger.

Figure 12:
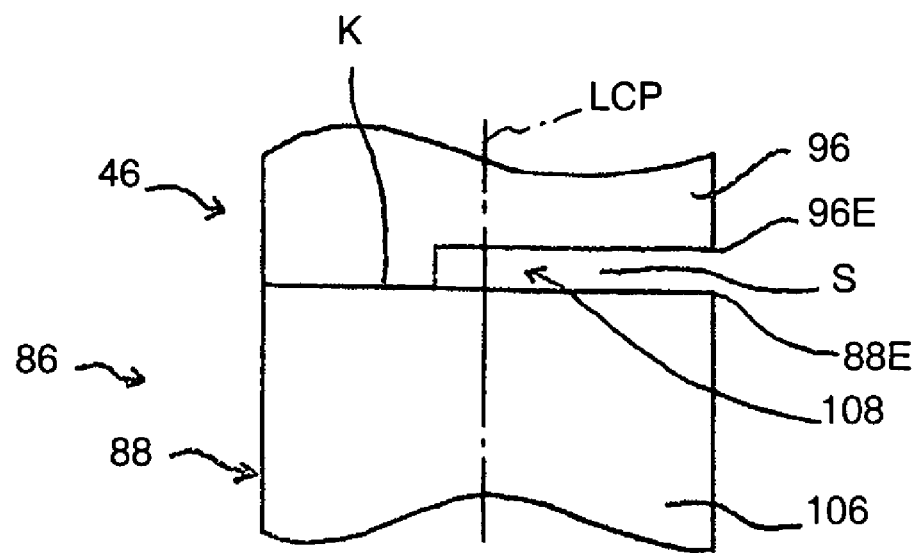
FIG. 12 schematically illustrates a variation of the main stand abutting against the engine unit in the normal extended position.

The step 108 is not necessarily provided on the stand body 88. In one variation, as shown in FIG. 12, the step 108 is provided on the bottom portion 96 of the engine unit 46. FIG. 12 also shows that the step 108 is slightly shifted to be spaced farther apart from the bias spring 89 relative to the longitudinal center plane LCP.

As described above, preferably, the engine unit housing 95 is produced in a casting process and at least two molds are used in the casting process. In the alternative arrangement of FIG. 12, the step 108 is formed by the molds used in the casting process. That is, the molds are slightly offset from each other in the casting process. An uneven surface is created by the gap between the molds. The uneven surface forms the step 108.

Although this invention has been disclosed in the context of certain preferred embodiments, it will be understood by those skilled in the art that the present invention extends beyond the specifically disclosed preferred embodiments to other alternative embodiments and/or uses of the invention and obvious modifications and equivalents thereof. For example, the foot boards are not necessarily boards.

While the present invention has been described with respect to preferred embodiments, it will be apparent to those skilled in the art that the disclosed invention may be modified in numerous ways and may assume many embodiments other than those specifically set out and described above. Accordingly, it is intended by the appended claims to cover all modifications of the present invention that fall within the true spirit and scope of the invention.

What is claimed is:

1. A vehicle comprising:
   a frame;
   a power unit provided to power the vehicle, the frame supporting the power unit;
   a stand body including a pair of legs transversely spaced apart from each other, the stand body being movable between an extended position and a retracted position, the stand body supporting the frame on a ground surface in the extended position;
   a pivot pin extending substantially transversely through a bottom portion of the power unit and a top portion of the stand body to pivotally couple the power unit and the stand body with each other; and
   a bias member arranged to bias the stand body toward the extended position and toward the retracted position;
   wherein
   the bias member extends between a side portion of the power unit and a lower portion of one of the pair of legs of the stand body;
   a top of the stand body and a bottom of the power unit contact each other at first portions thereof;
   the top of the stand body and the bottom of the power unit are spaced apart from each other at second portions thereof; and
   the second portions are disposed closer to the bias member than the first portions.

2. The vehicle as set forth in claim 1, wherein the power unit includes a first projection at the side portion thereof, the stand body includes a second projection at a lower portion of said one of the pair of legs, and the bias member extends between the first projection and the second projection.

3. The vehicle as set forth in claim 2, wherein the pivot pin has a pivotal axis, the first projection has a center axis, and the pivotal axis and the center axis are not aligned with each other.

4. The vehicle as set forth in claim 1, wherein the top of the stand body or the bottom of the power unit includes a step, the top of the stand body and the bottom of the power unit are divided into the first portions and the second portions at the step.

5. The vehicle as set forth in claim 4, wherein the top of the stand body and the bottom of the power unit include apertures, the pivot pin extends through the apertures, the apertures have an inner diameter that is substantially equal to an outer diameter of the pivot pin, the top of the stand body and the bottom of the power unit contact each other at the first portions when the apertures have the inner diameter that is substantially equal to the outer diameter of the pivot pin, and the top of the stand body and the bottom of the power unit contact each other at an edge of the step rather than at the first portions when the inner diameter of the apertures becomes larger than the outer diameter of the pivot pin due to extended use.

6. The vehicle as set forth in claim 4, wherein the vehicle has a longitudinal center plane that extends vertically and from front to rear of the vehicle, and the step is arranged substantially along the longitudinal center plane.

7. The vehicle as set forth in claim 4, wherein the power unit includes a housing, and an uneven surface of the housing defines the step.

8. The vehicle as set forth in claim 1, wherein the power unit includes an engine and a transmission coupled with the engine.

9. The vehicle as set forth in claim 1, wherein the power unit is an electric power unit.

10. The vehicle as set forth in claim 1, wherein a kick projection extends outward from a lower portion of one of the pair of legs.

11. A wheeled vehicle comprising:
    a frame;
    a power unit provided to power the vehicle, the frame supporting the power unit;
    a stand body including a pair of legs transversely spaced apart from each other, the stand body being movable between an extended position and a retracted position, the stand body supporting the frame on the ground in the extended position;
    a pivot pin extending substantially transversely through a bottom portion of the power unit and a top portion of the stand body to pivotally couple the power unit and the stand body with each other; and
    a bias member arranged to bias the stand body toward the extended position and toward the retracted position;
    wherein
    the bias member extends between a side portion of the power unit and a lower portion of one of the pair of legs of the stand body;
    the top portion of the stand body includes a first peripheral edge on a side of the stand body that is closer to the bias member than another side of the stand body;
    the bottom portion of the power unit includes a second peripheral edge on a side of the power unit that is closer to the bias member than another side of the power unit; and
    one of the top portion of the stand body and the bottom portion of the power unit includes a third peripheral edge arranged to maintain a space between the first and second peripheral edges.

12. The vehicle as set forth in claim 11, wherein the power unit includes a first projection at the side portion thereof, the stand body includes a second projection at a lower portion of said one of the pair of legs, and the bias member extends between the first projection and the second projection.

13. The vehicle as set forth in claim 12, wherein the pivot pin has a pivotal axis, the first projection has a center axis, and the pivotal axis and the center axis are not aligned with each other.

14. The vehicle as set forth in claim 11, wherein the stand body and the power unit include apertures; the pivot pin extends through the apertures, the apertures have an inner diameter that is substantially equal to an outer diameter of the pivot pin, the first peripheral edge of the stand body and the second peripheral edge of the power unit approach one another when the inner diameter of the opening becomes larger than the outer diameter of the pivot pin due to extended use, and the third peripheral edge prevents the first and second peripheral edges from contacting each other when the first and second peripheral edges approach one another.

15. The vehicle as set forth in claim 11, wherein a kick projection extends outward from a lower portion of one of the pair of legs.

16. A wheeled vehicle comprising:
   a frame;
   a power unit provided to power the vehicle, the frame supporting the power unit;
   a stand body including a pair of legs transversely spaced apart from each other, the stand body being movable between an extended position and a retracted position, the stand body supporting the frame on the ground in the extended position;
   a pivot pin extending substantially transversely through a bottom portion of the power unit and a top portion of the stand body to pivotally couple the power unit and the stand body with each other;
   a bias member arranged to bias the stand body toward the extended position and toward the retracted position; wherein
   the bias member extends between a side portion of the power unit and a lower portion of one of the pair of legs of the stand body;
   the top portion of the stand body includes a first peripheral edge on a side of the stand body that is closer to the bias member than another side of the stand body;
   the bottom portion of the power unit includes a second peripheral edge on a side of the power unit that is closer to the bias member than another side of the power unit; and
   at least one element is arranged to prevent the first and second peripheral edges from contacting each other.

17. The vehicle as set forth in claim 16, wherein the power unit includes a first projection at the side portion thereof, the stand body includes a second projection at a lower portion of said one of the pair of legs, and the bias member extends between the first projection and the second projection.

18. The vehicle as set forth in claim 17, wherein the pivot pin has a pivotal axis, the first projection has a center axis, and the pivotal axis and the center axis are not aligned with each other.

19. The vehicle as set forth in claim 16, wherein a kick projection extends outward from a lower portion of one of the pair of legs.

20. A method for attaching a stand to a power unit of a vehicle, comprising the steps of:
   arranging at least two molds offset from one another;
   casting a housing of the power unit using the two molds, the housing having a step created by the two molds;
   pivotally attaching the stand to the housing such that the stand faces the step; and
   attaching a bias member extending between one side of the housing and one side of the stand that is the same side as said one side of the housing; wherein
   the step creates a space between the housing and the stand, the space opening toward the side at which the bias member is attached.

* * * * *